Patented Apr. 13, 1937

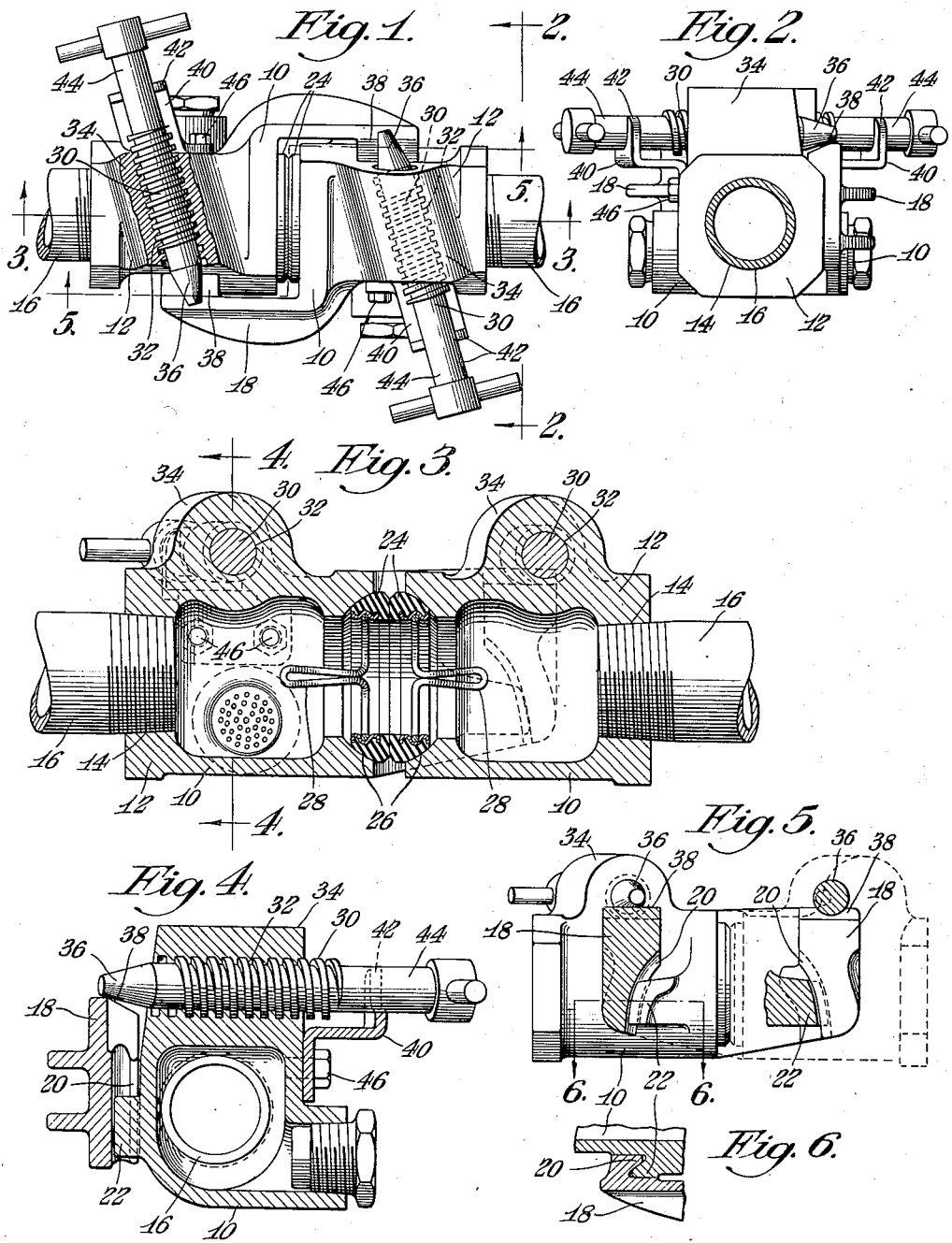

2,077,342

UNITED STATES PATENT OFFICE 2,077,342

COUPLER LOCK

August B. Masalsky, Chicago, Ill.

Application February 11, 1935, Serial No. 6,080

1 Claim. (Cl. 285—68)

My invention relates to couplers for hose ends or flexible end sections of the train pipes of railway cars, and has among its objects and advantages the provision of an improved latching device for holding the parts of the coupler in assembled relation.

In the accompanying drawing:

Fig. 1 is a plain view partly in section of a coupler embodying the invention;

Fig. 2 is an end view;

Fig. 3 is a sectional view along the line 3—3 of Fig. 1;

Fig. 4 is a sectional view along the line 4—4 of Fig. 3;

Fig. 5 is a sectional view along the line 5—5 of Fig. 1; and

Fig. 6 is a sectional view along the line 6—6 of Fig. 5.

In the embodiment selected to illustrate my invention, I make use of two head portions 10 each having a neck 12 provided with a threaded opening 14 for the reception of a pipe 16 having a flexible connection with a train pipe or a suitable connection with a hose end. Such connections are old and well known in the art and need not be described.

Each head is provided with a locking arm 18 projecting beyond the head having a hook-like cam flange 20 arranged to hook over a companion flange 22 cast integrally with the complemental head 10. Such engagement of the flanges 20 and 22 supports the heads 10 in end to end relation and presses the gasket parts 24 into sealing relation. These gaskets lie within the seats 26 and are provided with spring clips 28 for detachably connecting the parts with their respective heads. These gaskets are also well known in the art.

My invention resides in the provision of a latch screw 30 for each head. Each screw operates in a threaded opening 32 in an enlargement 34 carried by one of the heads. In Figs. 1 and 4, I illustrate the tapered end 36 of each screw as extending partly over the cam surfaces 38 on the locking arm 18 carried by the complemental head.

In operation, the heads 10 are connected by bringing them together with their adjacent ends higher than the opposite ends and moving the higher ends downwardly for engaging the hook-like flanges 20 with the flanges 22. In Fig. 5, the flanges 20 and 22 are curved and positioned in such angular relation as to cause the two heads 10 to be drawn tightly together for pressing the gasket parts 24 into firm sealing relation. At this time, the screws 30 are turned to bring the tapered ends 36 into contact with the cam surfaces 38 on the locking arm 18. When the screws 30 are turned down firmly, the heads are locked securely together so that a steam or fluid-tight connection is made between the gasket parts.

My screw latch provides a construction which is easy to operate and one in which a positive holding relation is established between the tapered end 36 and the cam surface 38. The screw principle eliminates the necessity for hammering wedge parts, such as is common practice in standard equipment. Frequently, the hammering of the wedge parts breaks the parts and flying fragments have caused injury to the workman making the connection. In addition, expansion and contraction in operation due to temperature changes and vibration have caused partial separation of the heads. Any slight separation or loosening of the sealing relation between the gasket parts 24 permits the escape of steam or other fluid under pressure. The construction illustrated provides a positive latch under all conditions of operation.

I provide a bracket 40 for each head 10. This bracket is provided with a bifurcated part 42 partly encircling the reduced reach 44 of the screw. This bracket prevents its associated screw from being completely removed from the threaded bore 32 to prevent loss of the screw as when it is unscrewed too far. I fasten the brackets 40 to their respective heads 10 by bolts 46.

Without further elaboration the foregoing will so fully explain my invention that others may, by applying current knowledge, readily adapt the same for use under various conditions of service.

I claim:

The combination of a pair of coupler heads each having an abutment, a locking arm carried by each coupler head and having a companion abutment arranged to engage the abutment on the other coupler head for holding the two heads in operative assembly, a screw connected with each coupler head and co-operating with the locking arm of the other head for holding the companion abutment on the locking arm in engagement with its associated abutment, each screw having a reduced reach, and a member carried by each head and co-operating with the reduced reach of its associated screw for limiting the axial movement of the screw.

AUGUST B. MASALSKY.